United States Patent
Lutz

[11] 3,798,722
[45] Mar. 26, 1974

[54] COUPLING ASSEMBLY
[75] Inventor: Gilbert F. Lutz, Chesterland, Ohio
[73] Assignee: The Warner & Swasey Company, Cleveland, Ohio
[22] Filed: Jan. 24, 1973
[21] Appl. No.: 326,403

[52] U.S. Cl............... 29/48.5, 74/813 L, 74/826, 82/36 A
[51] Int. Cl............................ B23b 29/32
[58] Field of Search............ 29/48.5, 49; 74/813 R, 74/813 C, 813 L, 822, 826; 82/36 A

[56] References Cited
UNITED STATES PATENTS
3,593,597   7/1971   Jennings .................. 74/822 X Primary Examiner—Francis S. Husar

[57] ABSTRACT

A machine tool constructed in accordance with the present invention includes an improved coupling assembly which is operable between an engaged condition in which the coupling assembly holds a turret against rotation and a disengaged condition in which the turret can be rotated to index tools relative to a workpiece. The coupling assembly includes a first coupling member on which there is an annular array of teeth. A housing is fixedly connected to the first coupling member and forms a main chamber in which a second coupling member is disposed. This second coupling member is fixedly connected with a turret bar and is movable in the main chamber under the influence of fluid pressure to operate the coupling assembly between engaged and disengaged conditions. When the coupling assembly is to be disengaged, fluid pressure is applied against a surface on the second coupling member to move the second coupling member in the main chamber in a direction away from the first coupling member to disengage the two sets of teeth. When the coupling assemblies are to be reengaged, fluid pressure is applied against another surface on the second coupling member to move the second coupling member toward the first coupling member and move the two sets of teeth into meshing engagement.

5 Claims, 6 Drawing Figures

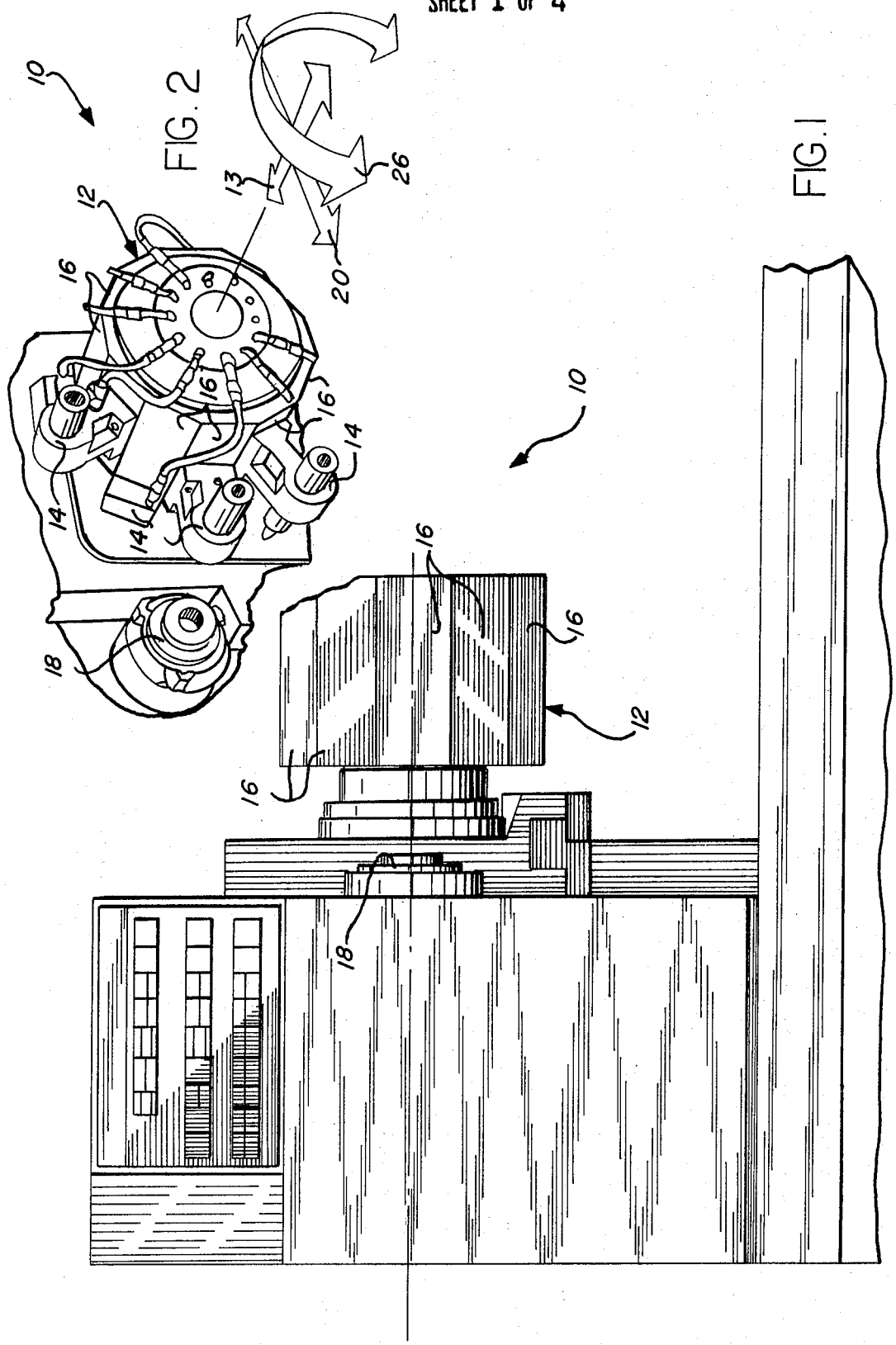

COUPLING ASSEMBLY

BACKGROUND OF THE INVENTION

The present invention relates generally to a machine tool having a turret which is selectively indexable to move a desired one of a plurality of tools into operative relationship with a workpiece and more specifically to an improved coupling assembly which is operable between an engaged condition holding the turret against rotation and a disengaged condition in which the turret can be rotated.

A machine tool having a turret which is rotatable and movable axially is disclosed in U.S. Pat. application Ser. No. 292,982, filed Sept. 28, 1972 by Baxter T. Fullerton and entitled "Machine Tool". An improved turret indexing and locking arrangement for use with machine tools similar to the one shown in the aforesaid Fullerton application is disclosed and claimed in U.S. Pat. application Ser. No. 322,131, filed Jan. 9, 1973 by Rudolph Vetsch and entitled "Turret Indexing and Locking Mechanism."

The turret indexing and locking mechanism disclosed in the aforesaid Vetsch application includes a hydraulically actuated coupling assembly. This coupling assembly includes a first coupling member which is fixedly connected with a turret bar and a second coupling member which is connected with a drive assembly for moving the turret bar axially. During operation of the Vetsch coupling assembly between the engaged and disengaged conditions, the coupling member connected with the axial drive arrangement acts as a fixed piston and a collar acts as the movable cylinder of a hydraulic motor. The collar is subjected to relatively high operating forces and may, and after an extended period of operation, break. Of course, breaking of this collar results in a malfunctioning of the machine tool with which it is associated.

SUMMARY OF THE PRESENT INVENTION

The present invention provides a new improved coupling assembly which is utilized in an indexing arrangement for moving the turret of a machine tool. This coupling assembly includes a first coupling member which is fixedly connected with a housing capable of withstanding relatively severe operating conditions. The housing cooperates with the first coupling member to form a main chamber in which a second coupling member is disposed. When the coupling assembly is to be operated from an engaged condition to a disengaged condition, fluid pressure is applied against a surface of the second coupling member to move it in the main chamber and separate a set of teeth disposed on the second coupling member from a set of teeth disposed on the first coupling member. When the coupling assembly is to be reengaged, fluid pressure is applied against the opposite side of the second coupling member to again move it in the main chamber and bring the two sets of teeth back into meshing engagement.

Accordingly, it is an object of this invention to provide a new and improved indexing and locking arrangement for the turret of the machine tool and wherein indexing and locking arrangement includes a coupling assembly having a relatively strong housing which defines a chamber in which a coupling member is moved under the influence of fluid pressure to operate the coupling assembly between engaged and disengaged conditions.

Another object of this invention is to provide a new and improved machine tool having a coupling assembly which is operable between an engaged condition holding a turret against rotation and a disengaged condition and wherein the coupling assembly includes a first coupling member fixedly connected with a relatively strong housing which forms a main chamber, a second coupling member disposed in this main chamber and fixedly connected with a turret of the machine tool, control apparatus for porting fluid under pressure to one end portion of the main chamber to apply fluid pressure against the second coupling member to move it in the main chamber in a direction away from the first coupling member to disengage the coupling assembly and for porting fluid under pressure to a second end portion of the main chamber to apply fluid pressure against another surface on the second coupling member to move it in the main chamber toward the first coupling member to thereby effect operation of the coupling assembly to the engaged condition.

BRIEF DESCRIPTION OF THE DRAWINGS

The foregoing and other objects and features of the present invention will become more apparent upon a consideration of the following description taken in connection with the accompanying drawings wherein:

FIG. 1 is a schematic illustration of a machine tool having a turret which can be moved axially and rotated relative to a workpiece held by a spindle;

FIG. 2 is a schematic illustration depicting the directions in which the turret of FIG. 1 can be moved relative to the spindle;

DESCRIPTION OF ONE PREFERRED EMBODIMENT

Figure 3:
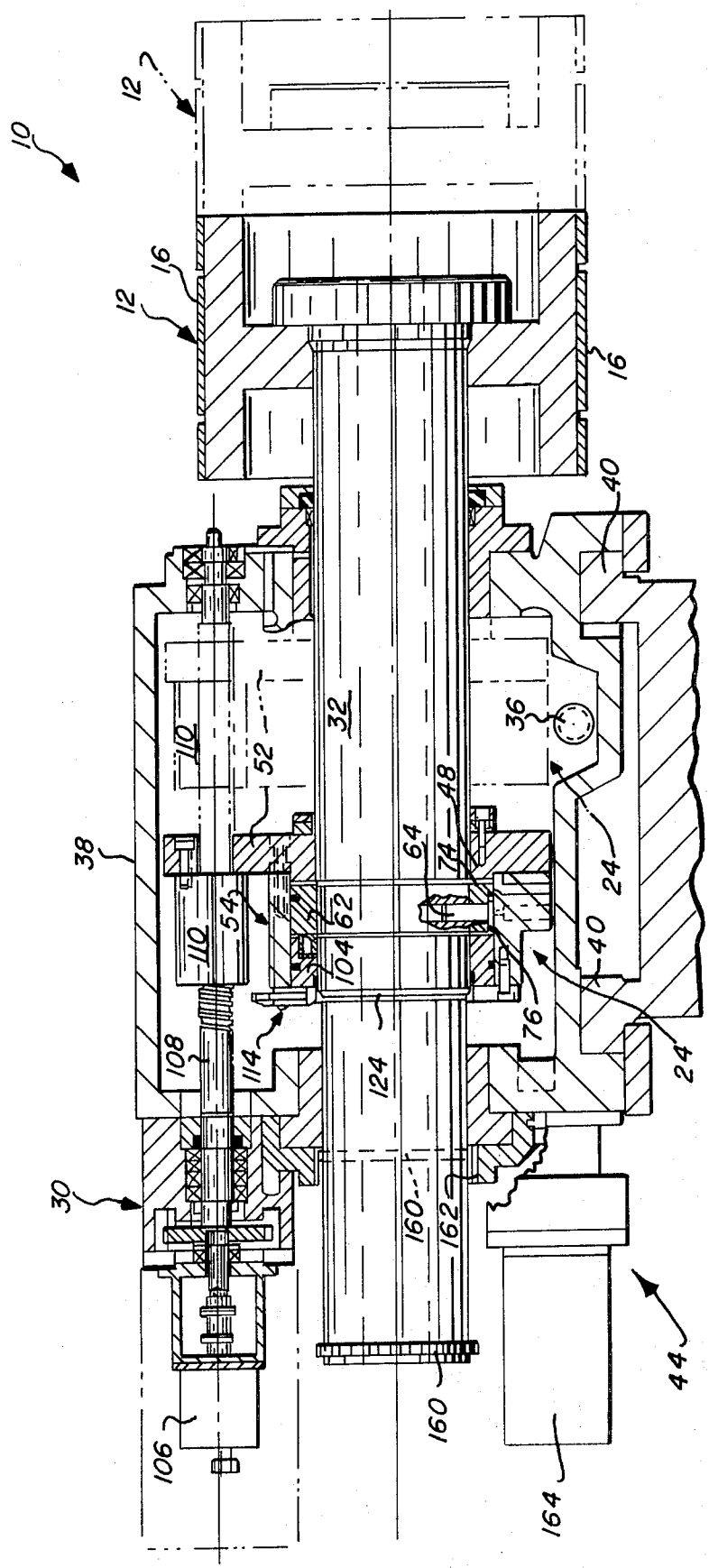
FIG. 3 is an enlarged sectional view illustrating the relationship between an improved coupling assembly which is operable between an engaged condition holding the turret against rotation and a disengaged condition, an axial drive arrangement for moving the turret axially with a coupling assembly engaged, and an indexing assembly for rotating the turret with a coupling assembly disengaged.

A machine tool 10 (FIG. 1) constructed in accordance with the present invention has a turret head 12 which is movable along an X-axis indicated by an arrow 13 in FIG. 2. The turret head 12 is movable along the X-axis between a retracted position (shown in solid lines in FIG. 3) and an extended position (shown in dashed lines in FIG. 3) to move suitable tools 14 (FIG. 2) on turret face or support surfaces 16 relative to a workpiece (not shown) as it is rotated by a spindle 18. The turret head 12 is also movable toward and away from the spindle 18 along a Y-axis indicated by the arrow 20 in FIG. 2. When an improved coupling assembly 24 (FIG. 3) is in a disengaged condition, the turret head 12 can be rotated about the X-axis in a manner indicated by the arrow 26 in FIG. 2.

When the turret head 12 is to be moved along the X-axis, a drive arrangement 30 (see FIG. 3) is activated to move turret bar 32 axially. When the turret head 12 is to be moved along the Y-axis, a drive screw 36 is rotated to move a carriage 38 along ways 40. When the clutch assembly 24 is disengaged, a turret indexing arrangement 44 can be activated to rotate the turret bar 32 and turret head 12 about the X-axis.

Figure 4:
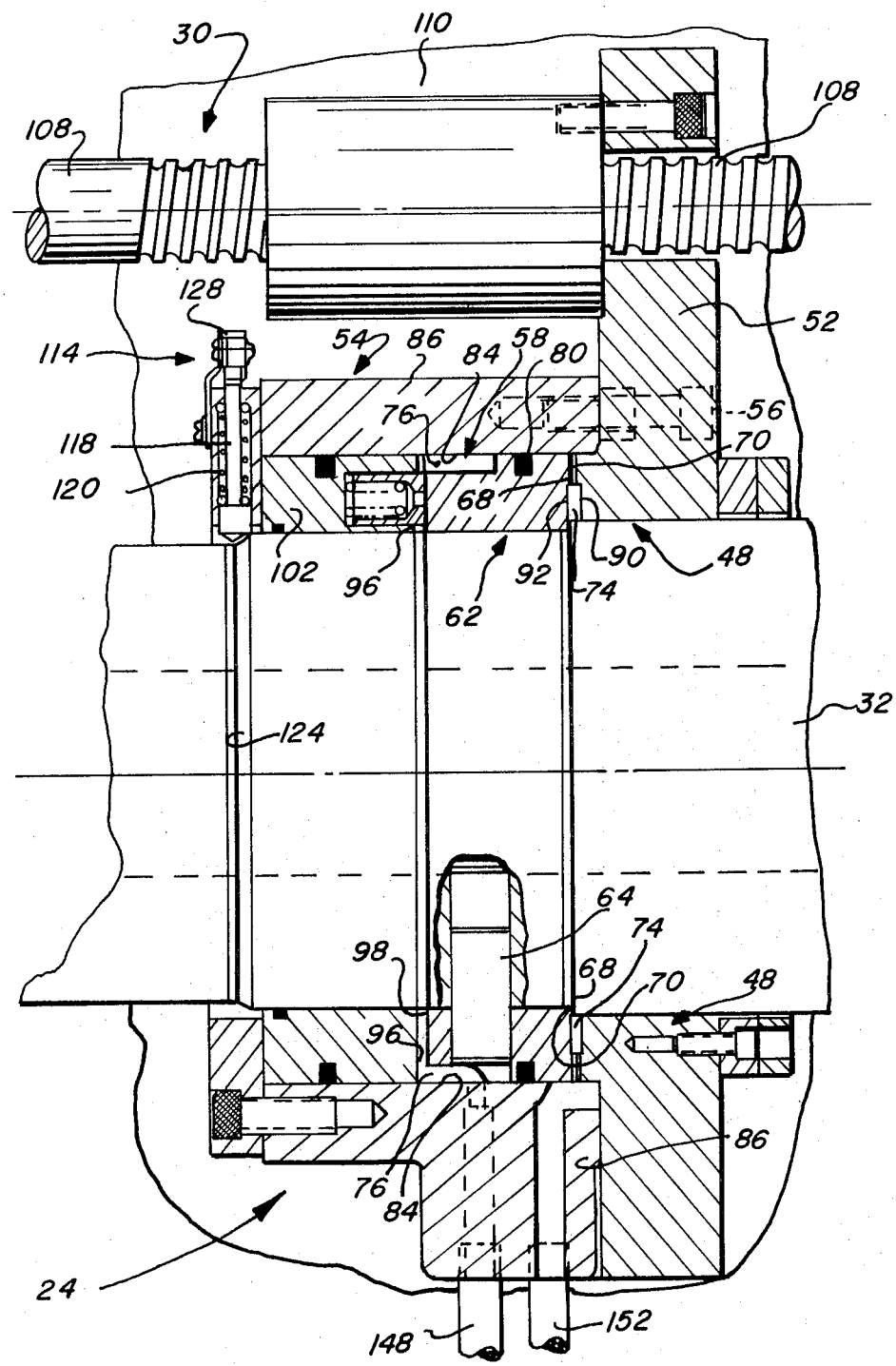
FIG. 4 is an enlarged fragmentary view illustrating the relationship between the coupling assembly and a turret bar, the coupling assembly being illustrated in an engaged condition.

The improved coupling assembly 24 includes a first coupling member 48 which is integrally formed with a drive plate 52 connected to the axial drive arrangement 30 (see FIG. 4). A relatively strong housing 54 is fixedly connected with the drive plate 52 by suitable bolts 56 and cooperates with the turret bar 32 and drive plate to define an annular main chamber 58. A second coupling member 62 is disposed in the main chamber 58 and is fixedly connected with the turret bar 32 by a plurality of connector pins 64 (only one of which is shown in FIG. 4).

An annular array of teeth 68 of the well known Curvic type are disposed on the coupling member 62. The teeth 68 engage a second annular array of teeth 70 on the coupling member 48 when the clutch assembly 24 is in the engaged condition shown in FIG. 4. The drive plate 52 is held against rotation in the manner disclosed in the aforesaid Vetsch application so that the meshing sets of teeth 68 and 70 hold the coupling member 62 and turret bar 32 against rotation when the clutch assembly 24 is in the engaged condition.

When the turret bar 32 and turret head 12 are to be indexed or rotated about their X-axis, the clutch assembly 24 must be disengaged to release the turret bar 32 for rotation. This is accomplished by moving the coupling member 62 rearwardly in the main chamber 58 from the position shown in FIG. 4 to the position shown in FIG. 5. This axial movement of the coupling member 62 separates the teeth 68 from the teeth 70 so that the coupling member 62 can be rotated relative to the coupling member 48.

Once the turret head 12 has been rotated to the desired position, the coupling assembly 24 is reengaged to hold the turret head against further rotation. This is accomplished by moving the coupling member 62 forwardly in the main chamber 58 from the position shown in FIG. 5 to the position shown in FIG. 4 to reengage the two sets of teeth 68 and 70. Thus, the coupling member 62 acts as a piston which is movable in the main chamber 58 to effect operation of the coupling assembly 24 between the engaged and disengaged conditions.

The coupling member 62 is moved axially in the main chamber 58 under the influence of fluid pressure. Thus, the coupling member 62 cooperates with the housing 54 to divide the main chamber 58 into two actuating chambers disposed on opposite sides of the coupling member 62, that is a first or front actuating chamber 74 a second or rear actuating chamber 76. To prevent the leakage of fluid between the front and rear chambers 74 and 76, a circular seal 80 is disposed on the coupling 62 in sealing engagement with a cylinderical inner surface of a collar or body portion 86 of the housing 54.

Figure 5:
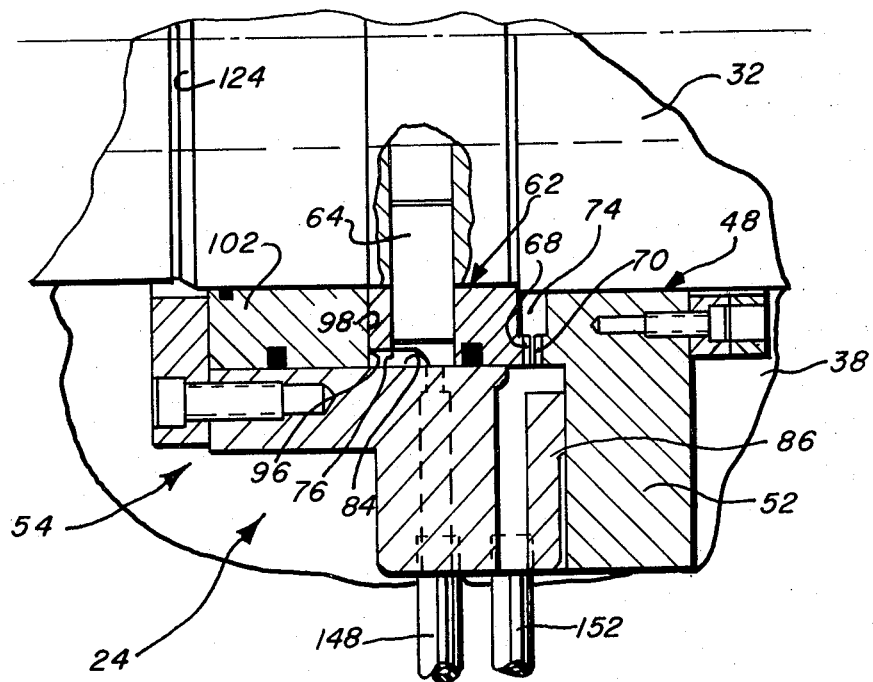
FIG. 5 is an enlarged fragmentary view illustrating a portion of the coupling assembly in a disengaged condition.

When the coupling assembly 24 is to be operated from the engaged condition of FIG. 4 to the disengaged condition of FIG. 5, fluid under pressure is conducted to the front actuating chamber 74. This fluid pressure applies a rearwardly directed force against opposing annular face surfaces 90 and 92 formed on the coupling members 48 and 62 inwardly of the teeth 68 and 70. Since the axial drive arrangement 30 holds the plate 52 against movement, the coupling member 62 is moved axially in the main chamber 58 under the influence of the fluid pressure applied against the face surface 92. This results in an expansion of the front actuating chamber 74 and operation of the coupling assembly 24 from the engaged condition of FIG. 4 to the disengaged condition of FIG. 5. Of course, this movement of the coupling member 62 in the main chamber 58 contracts the rear actuating chamber 76 which is exhausted to drain at this time to prevent a hydraulic lockup of the coupling assembly 24.

When the coupling assembly 24 is to be operated from the disengaged condition of FIG. 5 to the engaged condition of FIG. 4, fluid under pressure is conducted to the rear actuating chamber 76 to apply fluid pressure forces against opposing annular surfaces 96 and 98. The face surface 96 is formed on an annular housing member 102 which is fixedly connected with the body portion 86 of the housing 54. Since the housing 54 is held against axial movement by the drive arrangement 30, fluid pressure against the annular face surface 98 on the coupling member 62 causes the coupling member to move axially in the main chamber 58 toward the coupling member 48. This axial movement of the coupling member 62 brings the teeth 68 and 70 into meshing engagement to thereby reengage the coupling assembly 24. Of course, as the coupling member 62 moves toward the coupling member 48, the rear actuating chamber 76 is expanded and the front actuating chamber 74 is contracted.

Since the housing 54 remains stationary while the coupling member 62 moves in the main chamber 58, the housing 54 can be relatively strong and capable of withstanding severe operating conditions. This is particularly important since the axial drive 30 moves the turret bar 32 and turret head 12 under the influence of forces transmitted through the coupling assembly 24. Thus, when the axial drive arrangement 30 is activated to move the turret 12 from the reacted position (shown in solid lines in FIG. 3) toward the extended position (shown in dashed lines in FIG. 3), a reversible axial drive motor 106 is actuated to rotate a drive screw 108. Rotation of the drive screw 108 moves a ball-nut 110 axially along the drive screw 108 toward the right (as in viewed in FIG. 3). This rightward movement of the ballnut 110 is transmitted by the drive plate 52 to the housing 54 (see FIG. 4). The drive forces are transmitted from the housing 54 through high pressure fluid in the rear actuating chamber 76 to the coupling member 62 which is fixedly connected with the turret bar 32. These drive forces effect movement of the turret bar 32 and turret 12 toward the right (as viewed in FIGS. 1 and 3). It should be noted that the relatively high fluid pressure in the rear actuating chamber 76 maintains the coupling assembly 24 engaged and transmits the drive force from the housing 52 to the coupling member 62. If the housing 54 was not of a strong durable construction, it could break under the influence of the forces applied to it during operation of the axial drive arrangement 30.

A sensor assembly 114 (see FIG. 4) detects whether the clutch assembly 24 is in the engaged or disengaged condition. The sensor assembly 114 includes a plunger 118 which is pressed against the turret bar 32 under the influence of a biasing spring 120. When the clutch assembly 24 is actuated from the engaged position of FIG. 4 to the disengaged position of FIG. 5, the coupling member 62 and turret bar 32 are moved rearwardly. As the turret bar 32 moves rearwardly, an annular cam surface 124 on the turret bar forces the plunger 118 outwardly against the influence of the biasing spring 120. This outward movement of the plunger 118 actuates a switch 128. Of course, when the coupling assembly 24 is operated from the disengaged position to the engaged position, the turret bar 32 moves forward to the position shown in FIG. 4 and the plunger 118 moves inwardly to thereby release the switch 128.

Figure 6:
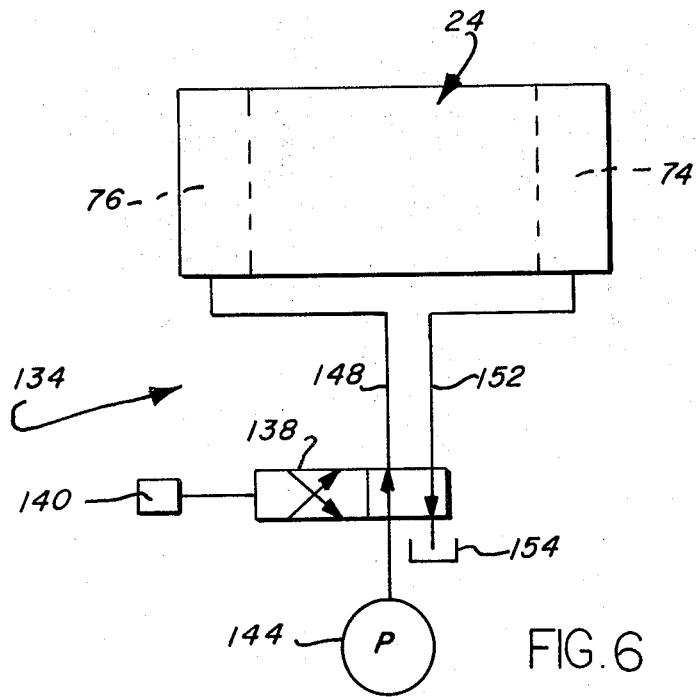
FIG. 6 is a schematic illustration of hydraulic control circuitry for effecting operation of the coupling assembly between the engaged and disengaged conditions.

A control apparatus 134 for effecting operation of the coupling assembly 24 between the engaged and disengaged conditions is illustrated in FIG. 6. The control apparatus 134 includes a valve 138 which is operated between the unactuated condition illustrated in FIG. 6 and an actuated condition under the influence of a solenoid 140. When the valve 138 is in the unactuated condition, fluid under pressure from a pump 144 is ported by the valve 138 to a conduit 148 connected to the rearward actuating chamber 76. As was previously explained, the fluid pressure in the actuating chamber 76 maintains the clutch assembly 24 in the engaged condition of FIG. 4.

When the clutch assembly 24 is to be disengaged, the solenoid 140 is energized and the valve 138 actuated to port fluid under pressure from the pump 144 to a conduit 152 connected to the front actuating chamber 74 in the coupling assembly 24. Actuation of the valve 138 also connects the chamber 76 with drain 154. As was previously explained, the fluid pressure in the actuating chamber 74 causes the clutch assembly 24 to be disengaged.

When the turret head 12 is to be indexed and rotated about its X-axis, as indicated by the arrow 26 in FIG. 2, it is necessary to first operate the axial drive arrangement 30 to move the turret head and turret bar 32 from the retracted position to be extended position. This moves an indexing gear 160 (FIG. 3) on the turret bar 32 into meshing engagement with a ring gear 162 which is rotatably mounted on the carriage housing 38. Once the gear 160 has been moved into meshing engagement with the gear 162, the valve 138 is actuated to port fluid under pressure to the front actuating chamber 74. The high pressure fluid effects operation of the coupling assembly 24 from the engaged condition of FIG. 4 to the disengaged condition in FIG. 5.

Operation of the coupling assembly 24 to the disengaged condition results in axial movement of the turret bar 32 and actuation of the switch 128 in the sensor assembly 114. Actuation of the switch 128 completes a circuit for energizing a drive motor 164 in the turret indexing arrangement 44 (see FIG. 4). Energization of the drive motor 164 rotates the gears 160 and 162 to thereby rotate the turret bar 32 and turret head 12 through a selected distance. Once the turret head 12 has been rotated through the desired distance, the valve 138 is actuated to again port fluid under pressure to the rear actuating chamber 76. Of course, the fluid pressure in the rear actuating chamber 76 moves the coupling member 62 in the main chamber 58 to reengage the coupling assembly 24 in the manner previously explained. As the coupling assembly 24 is reengaged the switch 128 on the sensor assembly 114 is opened to prevent inadvertent operation of the indexing motor 164.

In view of the foregoing description it is apparent that the improved assembly 24 includes a first coupling member 48 which is fixedly connected with a housing 54 capable of withstanding relatively severe operating conditions. The housing 54 cooperates with the first coupling member 48 to form a main chamber 58 in which a second coupling member 62 is disposed. When the coupling assembly 24 is to be operated from the engaged condition of FIG. 4 to the disengaged condition of FIG. 5, fluid pressure is conducted to the front actuating chamber 74. This pressure is applied against a surface 92 on the second coupling member 62 to move it in the main chamber 58. This movement expands the front actuating chamber 74 and separates a set of teeth 68 disposed on the second coupling member 62 from a set of teeth 70 disposed on the first coupling member 48. When the coupling assembly 24 is to be reengaged, fluid pressure is applied against the opposite side surface 98 of the second coupling member 62 to again move it in the main chamber and bring the two sets of teeth 68 and 70 back into meshing engagement.

Having described a specific preferred embodiment of the invention, the following is claimed:

1. A machine tool for operating on a workpiece, said machine tool comprising a base, turret means rotatably mounted in said base for holding a plurality of tools for operating on the workpiece, said turret means including a movable turret bar, means for supporting said turret bar for axial and rotational movement relative to said base, and a turret head connected with one end portion of said turret bar, coupling means operable between an engagement condition holding said turret bar against rotation relative to said base and a disengaged condition in which said turret bar is rotatable relative to said base to rotate said turret head and change the position of tools on said turret means relative to a workpiece, said coupling means including a first coupling member connected with said base, a first set of teeth disposed in an annular array on said first coupling member, housing means fixedly connected with said first set of teeth and disposed in engagement with said turret bar for defining a main chamber, a second coupling member fixedly connected with said turret bar and disposed in said main chamber, and a second set of teeth disposed in an annular array on said second coupling member, said second coupling member cooperating with said housing means to form said main chamber into a first operating chamber disposed between said first and second coupling members and a second operating chamber disposed between said second coupling member and housing means, first surface means disposed on said first coupling member for partially defining said first operating chamber, second surface means disposed on said second coupling means in a fixed positional relationship with said turret bar for further defining said first operating chamber, third surface means disposed on said second coupling member in a fixed positional relationship with said turret bar for partially defining said second operating chamber, and fourth surface means disposed on said housing means in a fixed positional relationship with said first surface means for further defining said second operating chamber, control means for porting fluid under pressure to said first operating chamber to effect movement of said second coupling member in said main chamber in a direction away from said first coupling member under the influence of fluid pressure forces applied against said second surface means to separate said first and second sets of teeth to operate said coupling means from the engaged condition to the disengaged condition and for porting fluid under pressure to said second operating chamber to effect movement of said second coupling member in said main chamber in a direction toward said first coupling member under the influence of fluid pressure forces applied against said third surface means to move said first and second sets of teeth into engagement to operate said coupling means for the disengaged condition to the engaged condition.

2. A machine tool as set forth in claim 1 further including sensor means connected with said housing means for detecting axial movement of said turret bar relative to said housing means to detect operation of said coupling means between the engaged and eisengaged conditions.

3. A machine tool as set forth in claim 1 further including passage means extending through said housing means for conducting fluid to and from said first and second operating chambers.

4. A machine tool as set forth in claim 1 wherein said second surface means includes an annular surface disposed on one side of said second coupling members inwardly of said second set of teeth and said third surface means includes an annular surface disposed on a side of said second coupling member opposite from said one side.

5. A machine tool as set forth in claim 1 further including connectors means for fixedly connecting said second coupling member to said turret bar.

* * * * *

UNITED STATES PATENT OFFICE
CERTIFICATE OF CORRECTION

Patent No. 3,798,722      Dated March 26, 1974

Inventor(s) Gilbert F. Lutz

It is certified that error appears in the above-identified patent and that said Letters Patent are hereby corrected as shown below:

Column 6, line 30, delete "in" and insert --on--.
Column 6, line 36, delete "engagement" and insert --engaged--.
Column 6, line 58, delete "means" and insert --member--.
Column 7, line 14, delete "for" and insert --from--.

Signed and sealed this 16th day of July 1974.

(SEAL)
Attest:

McCOY M. GIBSON, JR.      C. MARSHALL DANN
Attesting Officer      Commissioner of Patents